Feb. 24, 1931.  A. MOORHOUSE  1,794,087
MOTOR VEHICLE
Filed Jan. 26, 1925  2 Sheets-Sheet 1

Inventor
Alfred Moorhouse
By Milton Tibbetts
Attorney

Feb. 24, 1931. A. MOORHOUSE 1,794,087
MOTOR VEHICLE
Filed Jan. 26, 1925 2 Sheets-Sheet 2

Inventor
Alfred Moorhouse
By Milton Tibbitts
Attorney

Patented Feb. 24, 1931

1,794,087

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed January 26, 1925. Serial No. 4,803.

This invention relates to motor vehicles and particularly to the form and arrangement of the axle and steering connections.

Generally speaking, the usual form of connections from the steering axle to the frame have been by a pair of leaf springs connected to the axle, pivoted at their front ends to the frame, and shackled at their rear ends to the frame, and a connecting link or drag link connecting the steering gear with one of the steering knuckles, the two steering knuckles at the ends of the axle being connected by another link to make them move together. With this arrangement the axle in its movements relative to the frame moves in an arcuate path substantially about the front pivotal connection of the spring to the frame. At the same time, the steering knuckle connection referred to moves in an arc with the point of connection of the drag link to the steering gear as a center. These arcs may be said to be tangential at one point and their axes are on substantially opposite sides of the point of tangency. This arrangement obviously causes an oscillation of the steering knuckles whenever the front axle moves about the spring front pivot in the operation of the vehicle.

These and other defects in this arrangement of axle and associated parts were aggravated by the recent more or less general use of balloon or low pressure tires. The lack of stable connection with the road surface resulting from the low pressure tires increased the susceptibility to oscillation of the steering knuckles upon deflection of the springs and increased as well the shocks transmitted to the steering gear through the connecting link.

This arrangement of axle and associated parts was further confused when front wheel brakes came into general use because these brakes threw additional torsional loads on the axle and aggravated the spring action.

It is one of the objects of the present invention to correct the difficulties of the axle and steering connections of a motor vehicle and to simplify and strengthen the construction.

Another object of the invention is to provide connections between the axle and the frame and steering knuckles and the frame, of a motor vehicle, such that the movements of these parts will be more nearly together in the operation of the vehicle.

Another object of the invention is to provide axle and frame connections, in a motor vehicle, which will correct the tendency heretofore existing for the steering wheels of a vehicle to oscillate rapidly in the operation of the vehicle.

Another object of the invention is to provide a more direct connection between the axle and the frame rearwardly thereof so that the vertical movement of the axle, in the operation of the vehicle, may more closely coincide with that of the steering knuckle connection to the steering gear.

Another object of the invention is to provide a more direct connection between the frame and steering axle of a motor vehicle so that the axle may more readily resist the torsional strains due to braking.

Another object of the invention is to provide a relationship of axle, spring and steering connections of a motor vehicle, such that the torsional reaction of the axle to the braking will not materially affect the steering.

Other objects of the invention will appear from the following description taken in connection with the drawings, which form a part of this specification, and in which.

Figure 1:
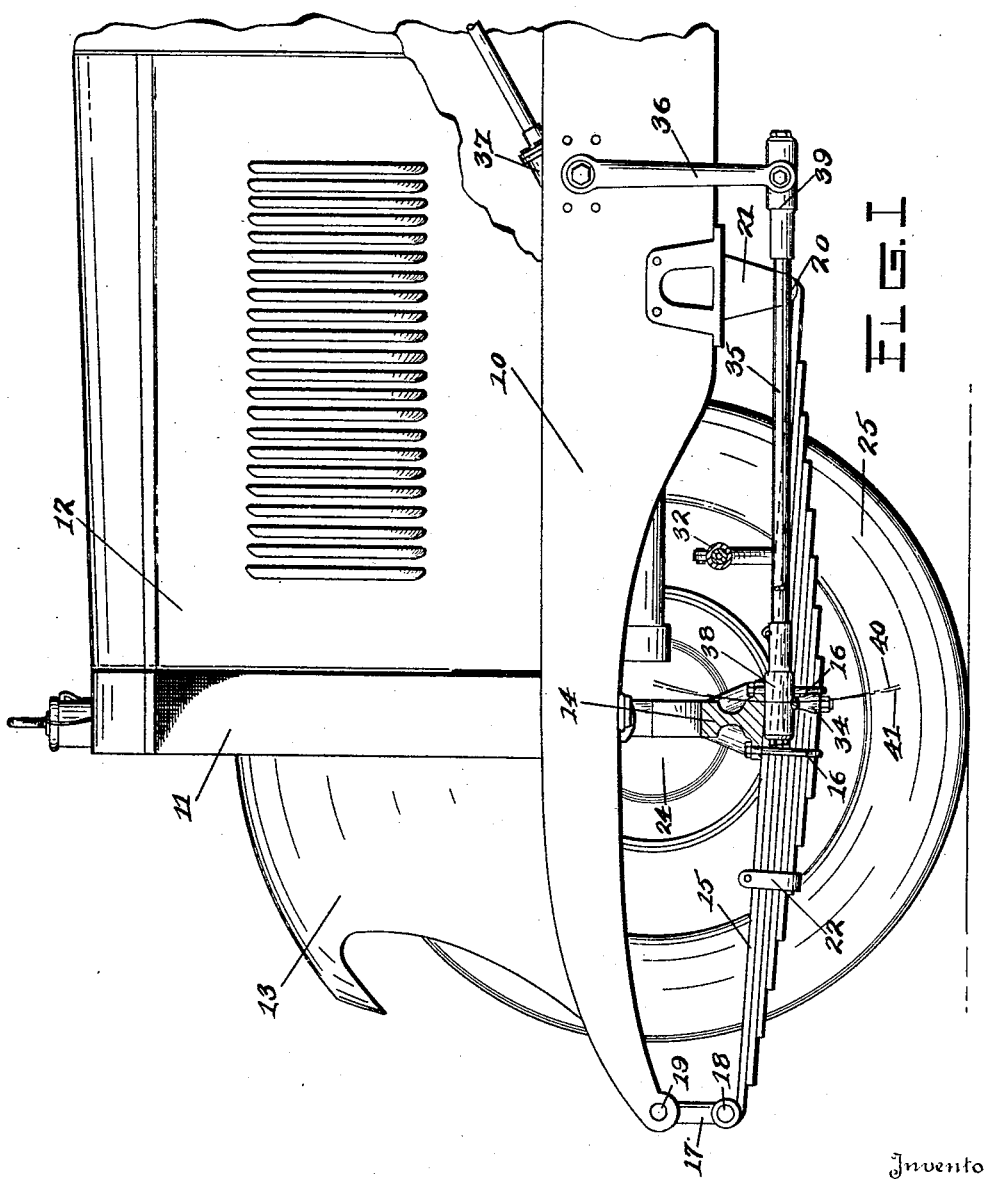
Fig. 1 is a side elevation of the front end of a motor vehicle embodying the invention, parts being broken away to more clearly illustrate the axle and steering connections.

Referring to the drawings, 10 represents the frame of a motor vehicle, 11 is the radiator, 12 is the bonnet or hood, and 13 is one of the fenders. An axle 14 is arranged beneath the frame, extending crosswise thereof near the front end, and a pair of multiple leaf springs 15 connect the axle to the frame. Each spring 15 is connected intermediate its ends to the axle 14 as by a pair of spring clips 16, and as shown the spring extends beneath the axle and its top leaf which is usually the main or longest leaf rests against the axle. In this way all strains or loads carried by or transmitted through the main leaf of the spring 15 are directly transferred to the axle 14 instead of passing through the other leaves as is the case where the spring is mounted on top of the axle. Also, the spring is nearer the ground than it would be if mounted on top of the axle and the braking strains are thereby more direct. In other words, the closer the spring is to the ground where the tire contacts to resist forward movement, the more direct is the braking load transferred to the spring and the frame and the less is the twisting action of the spring or axle. Thus, if the spring could be located horizontally at the ground, the braking resistance would be transferred directly to the frame through the spring without any twisting action on the axle or spring.

One only of the springs 15 will be described in detail but it will be understood that there are two of these springs at the front end of the vehicle, one for each of the side members of the frame 10.

The front end of the spring 15 is connected to the front end of the frame 10 by a shackle or link 17, the link being pivoted to the main leaf of the spring 15 as at 18 and to the frame as at 19. The rear end of the spring 15 is pivoted to the frame 10 as at 20, this pivot being in a bracket 21 secured to the frame side member. Thus the main leaf of the spring 15 is pivoted to the frame at 20, is rigidly secured against the underneath face of the axle 14 by the clips 16, and is shackled to the front end of the frame as by the link 17. A spring clip 22 is shown as connecting some of the leaves of the spring together. A similar clip may be used on the rear half of the spring but is omitted from the drawing in order not to confuse the showing.

From the above it will be seen that all twisting strains on the axle 14 will be transmitted to the frame 10 through the spring 15 and the main leaf of said spring forms a very direct connection between the frame and axle for that purpose.

Figure 2:
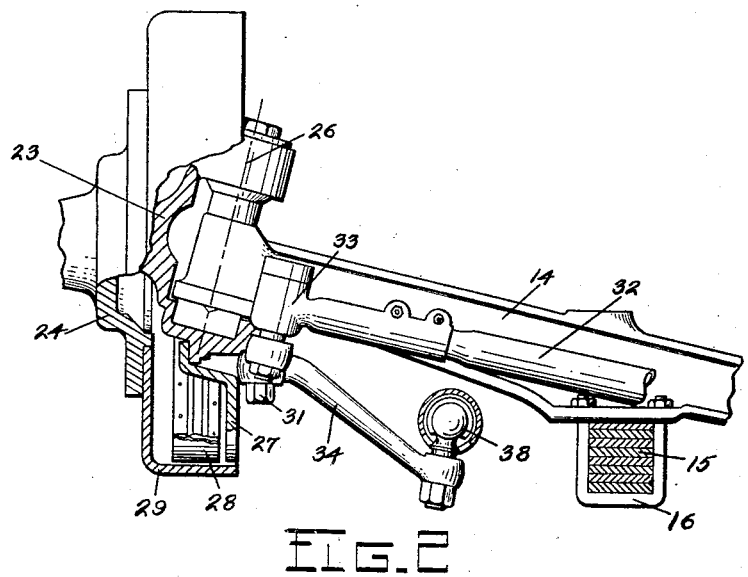
Fig. 2 is a vertical sectional view through one of the steering knuckles and one of the springs of the front axle shown in Fig. 1.
Figure 3:
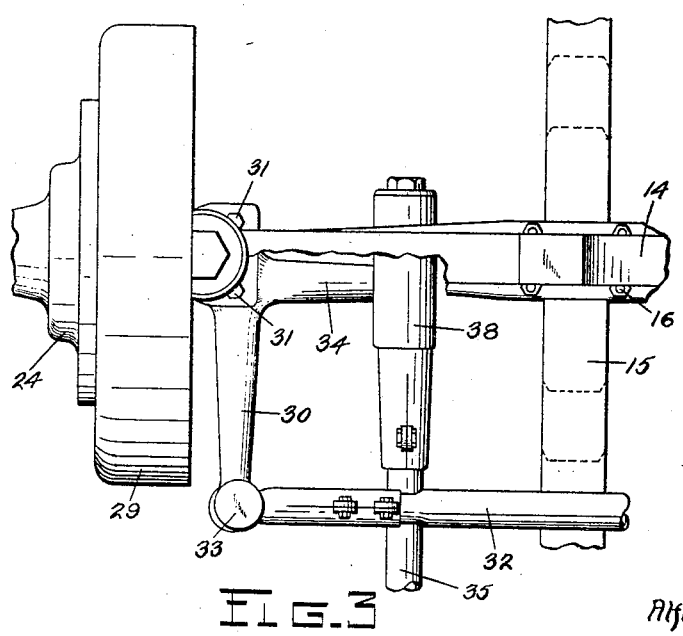
Fig. 3 is a plan view of the parts shown in Fig. 2, with a portion of the axle broken away to more clearly illustrate the steering connections.

At each end of the axle 14 is mounted a steering knuckle 23 upon which is mounted for rotation a wheel hub 24 and a wheel 25. The steering knuckle 23 is pivoted to the axle 14 on the inclined axis indicated by the dot-and-dash line 26, in Fig. 2. A brake supporting plate 27 is mounted on the steering knuckle and a brake 28 of suitable design is supported by the plate 27 for cooperation with a brake drum 29 mounted on the wheel hub 24. Suitable means, not shown, for operating the brake may be connected to the frame in any desired manner.

A rearwardly extending arm 30 is connected to the steering knuckle 23 as by a pair of bolts 31, and a cross connecting rod 32 connects the arms 30 of the two front wheels so that the steering knuckles will turn together as they are operated for turning the vehicle from one side to another. Suitable pivotal connections 33 are provided at the ends of the connecting rod 32.

An arm 34, shown as formed integral with the arm 30, extends from the steering knuckle 23 substantially parallel with the axle 14 towards the spring 15 and beneath the axle. This arm is connected by a connecting link or drag link 35 with a steering arm 36 on a steering gear 37 mounted on the frame of the vehicle as shown particularly in Fig. 1. Suitable ball and socket connections 38 and 39 connect the ends of the drag link 35 with the arm 34 and the steering arm 36 respectively. It will be noted that the center of the ball connection 38 is substantially in a horizontal plane with the main leaf of the spring 15 and the mounting of the steering gear 37 on the frame is such that the ball connection 39 is substantially in this plane also. Moreover, the spring bracket 21 preferably extends downwardly from the frame 10 so that pivot connection 20 is substantially in the same horizontal plane with the connections 38 and 39. From this it will be seen that the paths of movement of the axle 14 about the pivot 20 and the ball connection 38 of the steering knuckle about the pivot 39 will be substantially coincidental. In other words, these paths are arcs of circles one within the other, which arcs are tangent at the center of the ball connection 38. These arcs are indicated by broken lines at 40 and 41, the arc 40 being the arc upon which the axle 14 moves about the pivot 20 and the arc 41 being the arc upon which the ball connection 38 moves about the point or connection 39. Of course these arcs may be made to more nearly trace by shortening the connecting link 35 and making the connection 39 more nearly coincide with the pivot 20 but for practical purposes the form illustrated herein is sufficiently close.

From the above description it will be seen that as the spring 15 is deflected and the axle is moved upwardly towards the frame 10, the axle 14 will move in an arcuate path about the pivot 20 and the ball connection 38 will move in an arcuate path about the connection 39, and these paths are so nearly the same that there is no tendency for the steering knuckle to be oscillated during this movement of the axle.

Also, with the ball connection arranged, as shown, close to the longitudinal axis about which the axle rocks or rolls, as the brakes are applied to the wheels, the rocking of the axle will not have any materially bad effect on the steering.

While pivoted and shackle connections at 20 and 17 respectively are shown, it will be understood that other mechanical means producing a similar result may be substituted therefor without departing from the spirit of the invention. And while I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of a frame, a steering axle extending crosswise of the frame, a multiple leaf spring connected at both ends to the frame and intermediate its ends to the axle, the spring extending beneath the axle and having its top leaf secured against the axle, the connection of the front end of the spring to the frame being such as to permit the spring end to move longitudinally relative to the frame as the spring is flexed, and the connection of the other end of the spring to the frame being such as to substantially prevent the spring end moving longitudinally relative to the frame as the spring is flexed, a steering knuckle mounted on the axle, a steering gear mounted on the frame, and a connecting rod extending from said steering gear to said steering knuckle substantially parallel with the top leaf of the spring.

2. In a motor vehicle, the combination of a frame, a front axle, a steering knuckle pivoted to the axle, a wheel on the steering knuckle, braking means between the knuckle and wheel, a spring connecting the frame and axle and comprising a plurality of leaves, said spring extending beneath the axle with its top leaf secured against the axle, means for shackling the front end of said spring to the frame, means for pivoting the rear end of said spring to the frame, a steering gear mounted on the frame rearwardly of the axle, and a steering connecting rod extending from said steering gear to said steering knuckle substantially parallel with the top leaf of the spring.

3. In a motor vehicle, the combination of a frame, an axle, a steering knuckle pivoted to the axle, a wheel on the steering knuckle, braking means between the knuckle and wheel, a spring connecting the frame and axle, said spring extending beneath the axle with its top leaf secured against the axle, a steering gear mounted on the frame, and a connecting rod extending from said steering gear to said steering knuckle and pivotally connected to said knuckle, said pivotal connection being arranged adjacent the connection of the spring to the axle.

4. In a motor vehicle, the combination of a frame, an axle, a steering knuckle pivoted to the axle, a wheel on the steering knuckle, braking means between the knuckle and wheel, a spring connecting the frame and axle, said spring extending beneath the axle with its upper face secured against the axle, means for shackling the front end of said spring to the frame, means for pivoting the rear end of the said spring to the frame, a steering gear mounted on the frame rearwardly of the axle, and a connecting rod extending from said steering gear to said steering knuckle substantially parallel with the rear half of said spring and pivotally connected to said steering knuckle, said pivotal connection lying substantially in the longitudinal axis about which the axle rocks as the brakes are applied to the wheels.

5. In a motor vehicle, the combination of a frame, an axle, a steering knuckle pivoted to the axle, a wheel on the steering knuckle, braking means between the knuckle and wheel, a spring extending longitudinally of the frame and connecting the frame and axle, a steering gear mounted on the frame, and a connecting rod extending forwardly from said steering gear and pivotally connected to said steering knuckle, said pivotal connection being arranged substantially in the longitudinal axis about which the axle rocks as the brakes are applied, and the connection between the spring and the frame being such that the movement of the axle in compressing the spring is substantially in the same arc as that of the said pivotal connection of the connecting rod.

In testimony whereof I affix my signature.

ALFRED MOORHOUSE.